United States Patent
Szeliski (10) Patent No.: US 6,687,400 B1
(45) Date of Patent: Feb. 3, 2004

(54) SYSTEM AND PROCESS FOR IMPROVING THE UNIFORMITY OF THE EXPOSURE AND TONE OF A DIGITAL IMAGE

(75) Inventor: Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/334,860

(22) Filed: Jun. 16, 1999

(51) Int. Cl.$^7$ .................................................. G06K 9/00
(52) U.S. Cl. .......................... 382/168; 348/229; 382/169
(58) Field of Search ................................. 348/229, 230; 382/167, 168, 169, 218, 220

(56) References Cited

U.S. PATENT DOCUMENTS

| | | | | |
|---|---|---|---|---|
| 4,450,482 A | * | 5/1984 | Ackermann | 358/160 |
| 5,264,944 A | * | 11/1993 | Takemura | 358/335 |
| 5,309,243 A | | 5/1994 | Tsai | |
| 5,517,242 A | | 5/1996 | Yamada et al. | |
| 5,801,773 A | | 9/1998 | Ikeda | |
| 5,828,793 A | * | 10/1998 | Mann | 382/284 |
| 5,875,021 A | | 2/1999 | Yamaguchi | |
| 6,040,858 A | * | 3/2000 | Ikeda | 348/242 |
| 6,163,621 A | * | 12/2000 | Paik et al. | 382/269 |
| 6,204,881 B1 | * | 3/2001 | Ikeda et al. | 348/362 |

FOREIGN PATENT DOCUMENTS

| | | |
|---|---|---|
| EP | 0 609 592 A2 | 8/1994 |
| EP | 0 772 158 A2 | 5/1997 |
| EP | 0 866 608 A2 | 9/1998 |

OTHER PUBLICATIONS

Croarkin, Carroll et al. Engineering Statistic Handbook, "1.3.6.2 Related Distribution", http://www.itl.nist.gov/div898/handbook/index.htm, p. 1–6.

P. E. Debevec and J. Malik. Recovering high dynamic range radiance maps from photographs. In Computer Graphics (SIGGRAPH'97) Proceedings, pp. 369–378, Los Angeles, California, Aug. 1997.

* cited by examiner

*Primary Examiner*—Samir Ahmed
*Assistant Examiner*—Brian Q Le
(74) *Attorney, Agent, or Firm*—Lyon & Harr, LLP; Richard T. Lyon

(57) ABSTRACT

A system and method for manipulating a set of images of a static scene captured at different exposures (i.e., "bracketed" images) to yield a composite image with improved uniformity in exposure and tone. In general, the aforementioned goal can be achieved by analyzing a set of bracketed images using a multi-dimensional histogram and merging the images via an approach that projects pixels onto a curve that fits the data. However, it has been found that the desired composite image can be produced in a simpler manner by summing the pixel brightness levels across the multiple images, followed by an equalization process. One possible equalization process involves simply averaging the summed pixel brightness values by dividing the summed value of each pixel set (i.e., groups of corresponding pixels from the bracketed images) by the number of bracketed images. An even better result can be achieved using a histogram equalization process. In essence, this histogram equalization involves creating a count of the number of pixels sets having the same summed brightness level. From this count, a cumulative distribution function is computed and normalized to a maximum value corresponding to the maximum summed brightness level. The cumulative distribution function is then used to determine new pixel brightness levels for use in generating the composite image.

27 Claims, 7 Drawing Sheets

(1 of 7 Drawing Sheet(s) Filed in Color)

SYSTEM AND PROCESS FOR IMPROVING THE UNIFORMITY OF THE EXPOSURE AND TONE OF A DIGITAL IMAGE

BACKGROUND

1. Technical Field

The invention is related to image processing in general, and more particularly, to a system and process for generating a composite image from a set of digital images of a static scene captured at different exposure levels. The composite image exhibits an improved uniformity in both exposure and tone in comparison to the set of input images.

2. Background Art

Digital cameras suffer from several deficiencies when compared with traditional photographic film. Among these are a lower dynamic range and a resulting inconsistency in the uniformity of both exposure and tone across an image captured by current digital cameras.

Figure 1A:
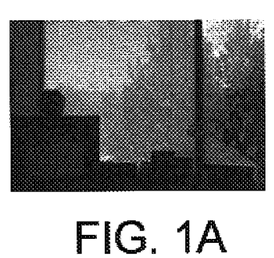
FIGS. 1A through 1C are images depicting an office scene captured at different exposure settings.
Figure 1B:
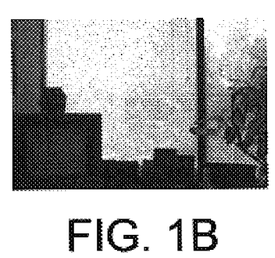
Figure 1C:
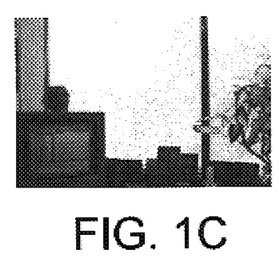

FIGS. 1A through 1C present digital images which will be used to explain the dynamic range problem. FIGS. 1A through 1C show three images of an office desk and window, taken at different exposures. Specifically, these images were captured with a Kodak DCS-40 camera, by adjusting the exposure up and down by two "stops". FIG. 1B represents an image taken at what was considered the "proper" exposure, whereas, the image of FIG. 1A is considered to be "underexposed" and the image of FIG. 1C is considered "overexposed". Notice how the "underexposed" image of FIG. 1A shows better detail for the outside elements (e.g., trees, sky), while the "overexposed" image of FIG. 1c shows the interior element (e.g., portraits) better. Also note that while the image of FIG. 1B was taken at what would normally be considered the proper exposure, it still contains areas that appear to be underexposed or overexposed.

SUMMARY

The present invention relates to a system and process for manipulating a set of images of a static scene captured at different exposures (i.e., "bracketed" images) to yield a composite image with improved uniformity in exposure and tone.

Bracketing is term used in photography meaning to take photographs of the same scene at multiple exposure setting in hopes of obtaining one with the optimum exposure level. This term is borrowed in the context of the present invention to describe a process for overcoming the aforementioned shortcomings of cameras in respect to dynamic range. In general, the invention involves combining multiple images having different exposure levels in such a way as to create a "better looking" image. It is noted that for the purposes of this description, the term "bracketed" images will mean a set of images having different exposure levels.

A better looking image can be obtained because it has been found that objects depicted in an image of a scene tend to vary in detail depending on the exposure setting. For example, in the previously described experiment it was found that objects in the background of an image appeared in greater detail in an underexposed image, while objects in the foreground showed more detail in an overexposed image. It is believed these inconsistencies resulted in a non-uniformity in the exposure and tone associated with the various pixels making up different parts of the image. The goal of the subject invention is to produce a single image from images of a static scene taken at different exposures, which captures to some extent, the portions of each image providing the best exposure and tone characteristics.

In general, the aforementioned goal can be achieved by analyzing a set of bracketed images using a multi-dimensional histogram and merging the images via an approach that projects pixels onto a curve that fits the data. However, it has been found that the desired composite image having improved exposure and tone can also be produced in a simpler manner by summing characteristic pixel values across the multiple images, followed by an equalization process. The characteristic pixel values are preferably any appropriate measure of the pixel brightness level (also known as the luminous intensity value) exhibited by a pixel. For example, if the images are black and white, the pixel gray level could be used. If color images are involved, the Y-luminance channel could be used.

One possible equalization process would be to simply average the chosen characteristic pixel values. This is accomplished by dividing the summed value of each pixel set by the number of images in the set of images. It is noted that a pixel set is made up of all the corresponding pixels from the bracketed images, where corresponding pixels are defined as the pixels that represent the same portion of the depicted scene. While this simple averaging method does produce a better looking picture, an even better apparent dynamic range can be achieved using a histogram equalization process.

In essence, this histogram equalization involves creating a count of the number of pixels sets having the same summed brightness level. From this count, a cumulative distribution function is computed and normalized to a maximum value corresponding to the maximum summed brightness level. The cumulative distribution function is then used to determine new pixel brightness levels to use in generating the composite image. Specifically, the normalized cumulative count value that corresponds to the summed brightness value associated with each pixel set is identified and divided by the number of images in the set of bracketed images to produce a new pixel brightness value associated with each pixel set. The composite image is generated by using the new pixel brightness value associated with a pixel set as the pixel value for a pixel in the composite image corresponding to the location of the pixels of the associated pixel set in the scene depicted by the images.

A further refinement can be implemented by employing a partial equalization approach. Partial equalization can be described as the blending of the aforementioned normalized cumulative distribution function with a straight line function. The degree of equalization of the image is controlled by the percentage of blending of the straight line function with the cumulative distribution function (i.e. any blend between 0% and 100% is possible).

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing (s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2:
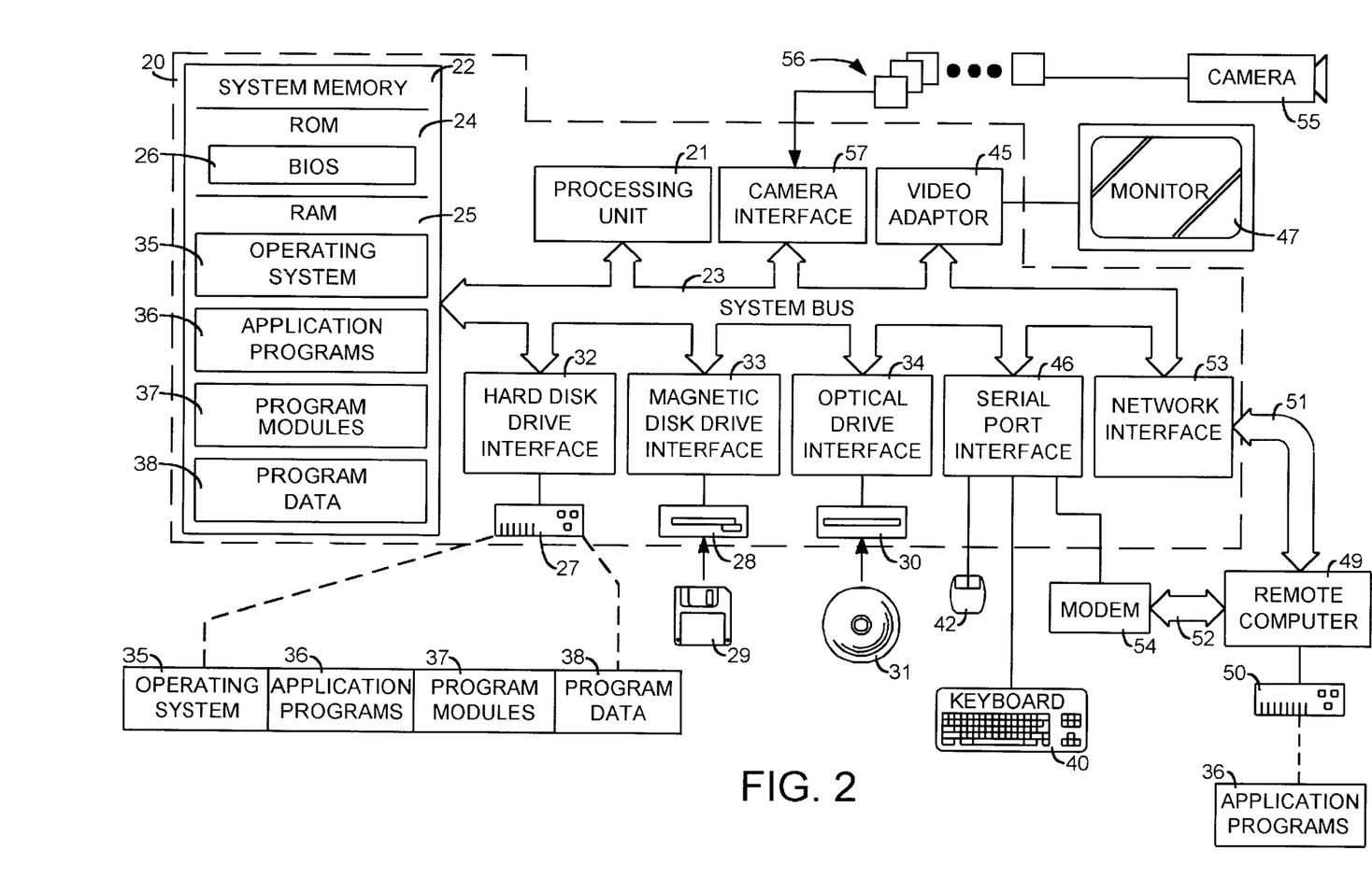
FIG. 2 is a diagram depicting a general purpose computing device constituting an exemplary system for implementing the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention.

Figure 3:
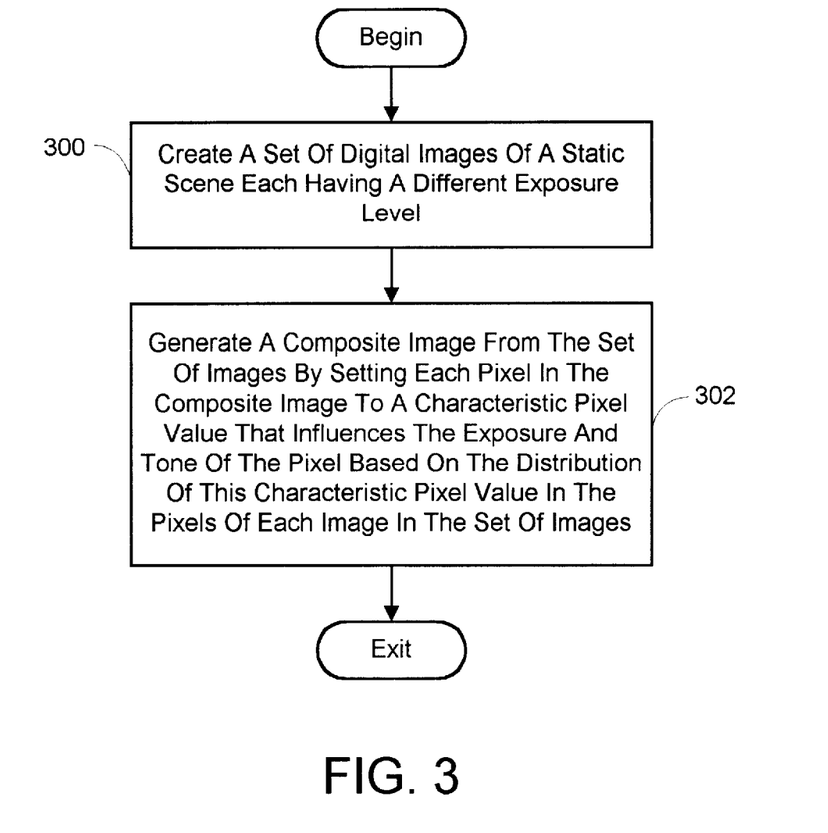
FIG. 3 is a block diagram of an overall process for generating a composite image having a more uniform exposure and tone in comparison to any image in a set of bracketed images used as a basis for the composite image.

In general the present invention relates to a system and process for creating a composite image from a set of digital images of a static scene. This composite image exhibits an improved uniformity in both exposure and tone throughout the composite image in comparison to the original set of images. FIG. 3 presents a high-level outline of the steps required to produce the aforementioned composite image. As can be seen there are two basic steps in the task. In the first step 300, a set of digital images of a static scene is created. Each of these images is captured at a different exposure level. As mentioned previously the images are collectively referred to as "bracketed" images. The second step 302 is then to generate the desired composite image from the set of bracketed images by setting each pixel in the composite image to a characteristic pixel value based on the distribution of this characteristic pixel value in the pixels of each image in the set of bracketed images. As indicated previously, the characteristic pixel values are preferably the pixel brightness levels (also known as the luminous intensity values) exhibited by a pixel as the brightness directly influences the exposure and tone of the pixel.

1.0. Fitting A Multi-Brightness Curve

The first approach according to the present invention for creating the aforementioned composite image involves analyzing the set of "bracketed" images using a multi-dimensional histogram and projecting pixels onto a curve that fits the data. The flow chart presented in FIG. 4 outlines this approach. In the first step 400 of the procedure, the brightness values associated with each pixel in each of the bracketed images are used to generate a n-D histogram, where n corresponds to the number of images in the set of bracketed images.

Figure 5A:
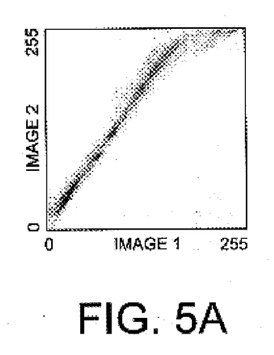
FIGS. 5A through 5C are graphs plotting 2-D histograms based on the brightness values of pixels in pairs of the images of FIGS. 1A through 1C.
Figure 5B:
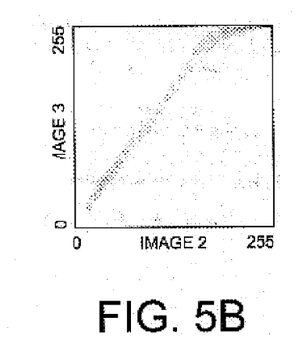
Figure 5C:
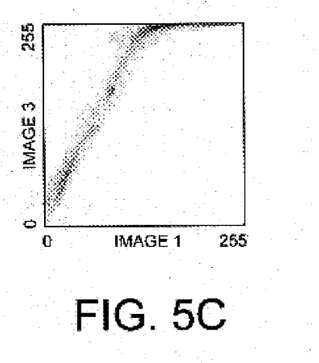

The distribution of pixel values across the set of bracketed digital images could be visualized by examining a plot of the just described histogram. For example, referring once again to the three images shown in FIGS. 1A through 1C, a 3-D histogram could be plotted for examination. However, it is believed an even simpler way of presenting the distribution data would be to plot a series of 2-D histograms of pairs of images in the set. Three such 2-D histograms are presented in FIGS. 5A through 5C, respectively. The histogram shown in FIG. 5A plots pixels values associated with the image of FIG. 1A (horizontal axis) against the values exhibited by correspondingly located pixels in the image of FIG. 1B (vertical axis). The histogram shown in FIG. 5B plots pixels values associated with the image of FIG. 1B (horizontal axis) against the values exhibited by correspondingly located pixels in the image of FIG. 1C (vertical axis). And finally, the histogram shown in FIG. 5C plots pixels values associated with the image of FIG. 1A (horizontal axis) against the values exhibited by correspondingly located pixels in the image of FIG. 1C (vertical axis). Each of these histograms was generated by taking pairs of pixels from the two images being consideration, and plotting their respective red, green and blue pixel levels (i.e., level 0 through level 255) on the graph.

The same trend can be seen in the histograms of all three pairs of images. The values in the two images are related by a linear slope for underexposed and properly exposed pixels, and saturate earlier in the more exposed image. Surprisingly, the is not a strong tail (saturation) effect in the dark regions. It is believed this occurs because, for these images, there were no parts of the scene that were below the sensitivity range of the camera.

From the three 2D histograms in FIGS. 5A through 5C, it is possible to get a clear idea of what the full 3D histogram would look like. Specifically, the data points would cluster around a space curve that has a roughly linear behavior in one region, and clings to hypercube faces or edges in other places. Identifying this curve is the next step in the process of creating a composite image from the bracketed images. Thus, referring once again to FIG. 4, the next step 402 in the process is to fit a curve to the data points of the previously constructed n-D histogram. This step of the process can be achieved in a number of ways. For example, it is possible to construct a spline curve to model the ideal curve associated with the data. The spline itself could be computed using any appropriate conventional dynamic curve-fitting algorithm, or perhaps modeled as a combination of elongated ellipsoids. However, to simplify the curve fitting process, it would also be possible to project all data points onto a series of parallel planes, and compute the centroid (and distribution, if desired) of each plane. The centroids of the planes would then define the curve fitting the data. One potential set of planes that could be used for this purpose are the so-called summed brightness planes. These summed brightness planes represent the sum of all pixel levels across the n images. A nice property of summed brightness is that it is a monotonic function of the true luminance, as long as each of the sensor responses is itself monotonic.

Figure 4:
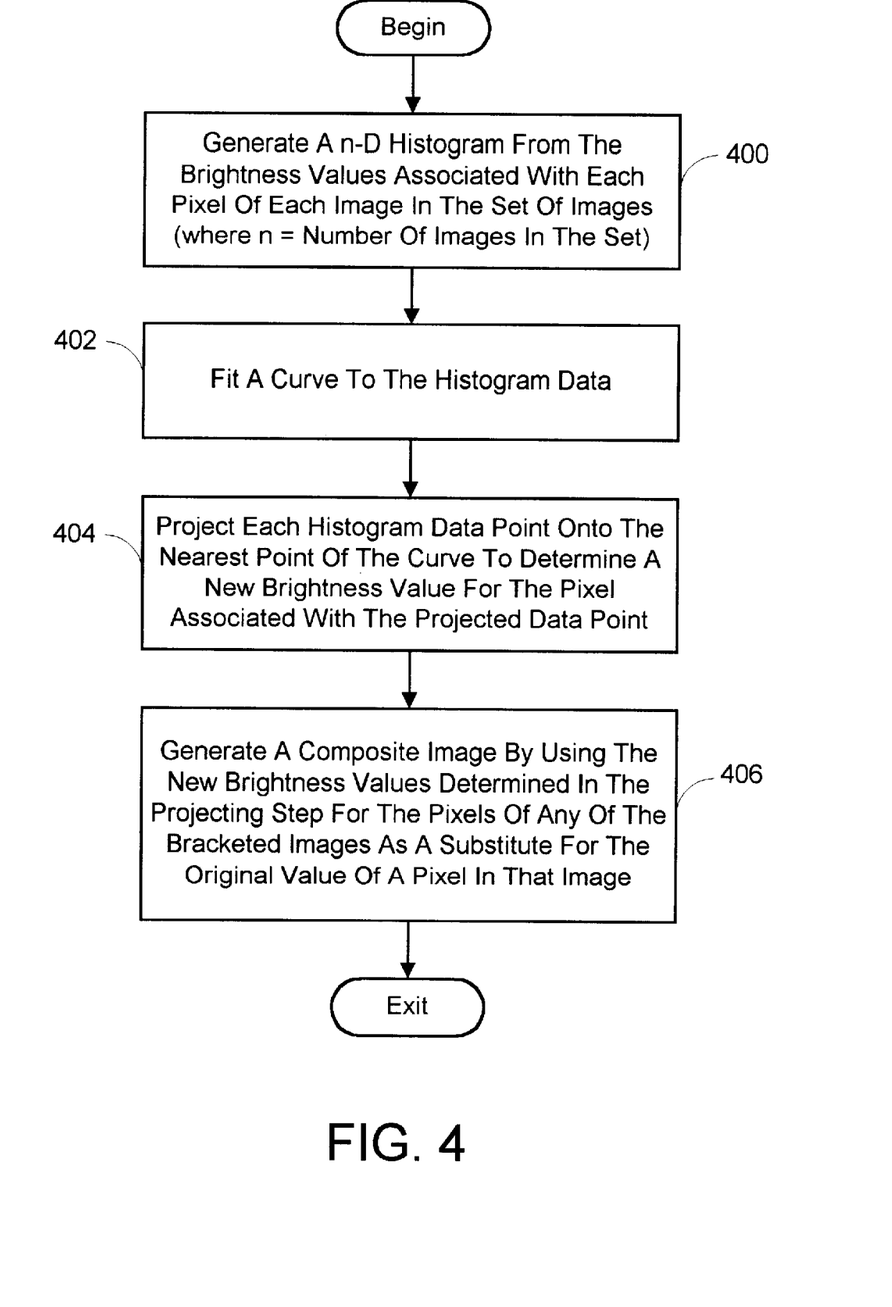
FIG. 4 is a block diagram of a process for accomplishing the composite image generation module of the overall process of FIG. 3.

In general, it is possible to produce the composite image from any n-bracketed images of a scene (i.e., three in the example case) by projecting n-D pixel values (taken from the n input images) onto the aforementioned curve, and then mapping points along the curve into the final gamut. Thus, the next step 404 in the process is to project each of the histogram data points onto the nearest point of the curve to determine a new brightness value for the pixel associated with a projected data point. Then, in step 406 a composite image is generated by using the new brightness values determined in the projecting step for the pixels of any of the bracketed images as a substitute for the original value of a pixel in that image.

2.0. Using The Summed Brightness Planes Directly

Figure 6:
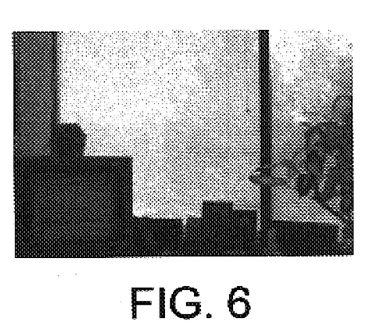
FIG. 6 is a composite image produced from the bracketed images of the office scene of FIGS. 1A through 1C that exhibits a more uniform exposure and tone than any of the bracket images, wherein an averaged summed brightness equalization process was employed to generate the composite image.

Rather than fitting a curve and projecting the pixels onto it, an alternate approach would be to use the summed brightness values directly to produce a composite image with improved exposure and tone. One simple example of such an approach would be to sum the pixel values associated with all the correspondingly located pixels in n-bracketed images, and then divide by the number of images to restore the original gamut and create the desired composite image. FIG. 6 shows the results of this procedure using the three images of FIGS. 1A through 1C. Notice how a better apparent dynamic range is obtained with just this simple trick.

Another approach that employs the summed brightness planes directly involves using the summed brightness values as input to a histogram equalization process. While the summed brightness approach throws away information that might be needed to recover true luminance, it is a perfectly acceptable input to a histogram equalization process (since it would be expected that pixel values projected onto the space curve and the corresponding summed brightnesses are similar). Furthermore, summed brightness is advantageous in that it has the effect of weighting "non-clamped" pixel values more than the clamped values (since those values contribute little to the variation of summed brightness).

3.0. Histogram Equalization

Figure 7A:
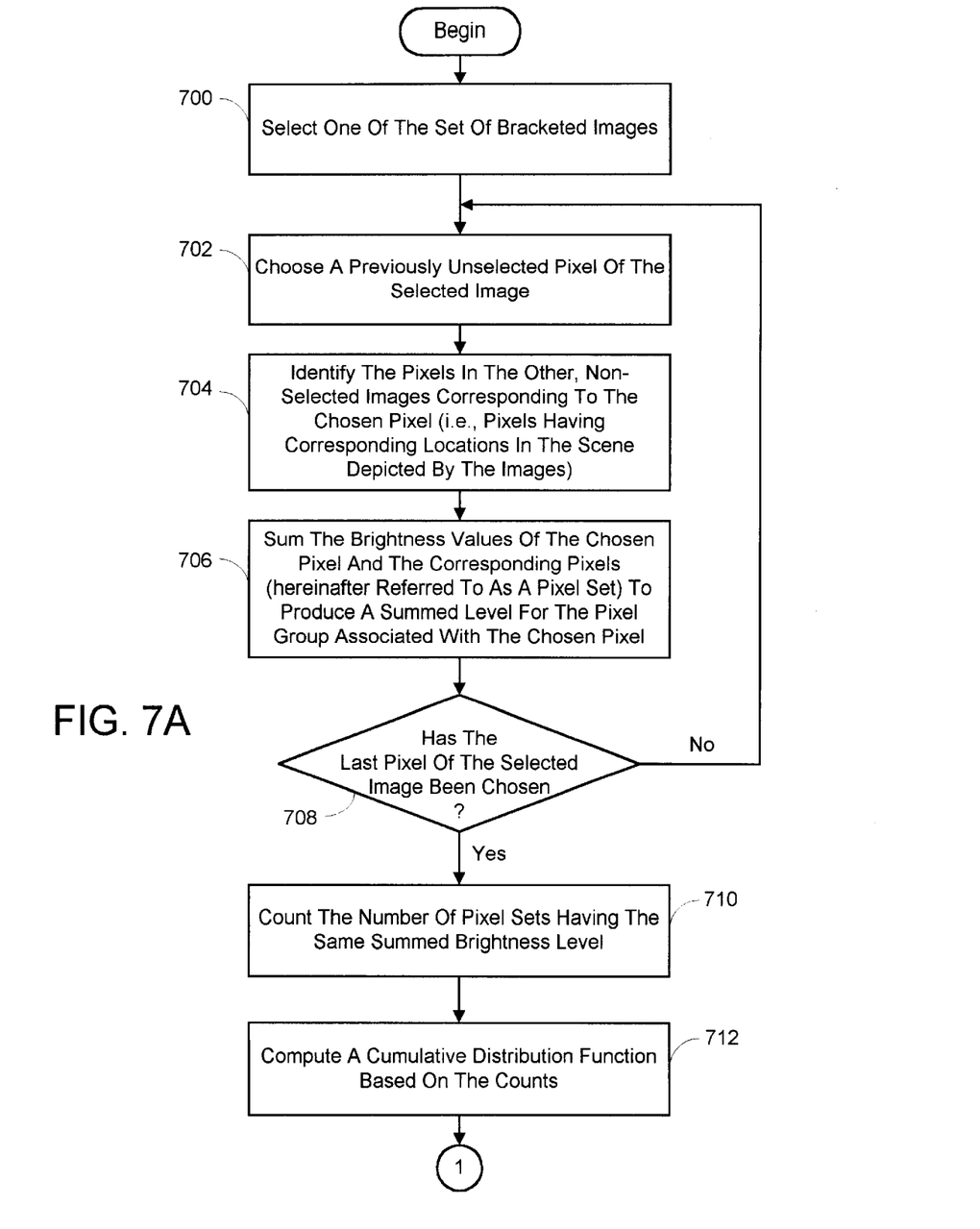
FIGS. 7A and 7B are block diagrams of an alternate process for accomplishing the composite image generation module of the overall process of FIG. 3.
Figure 7B:
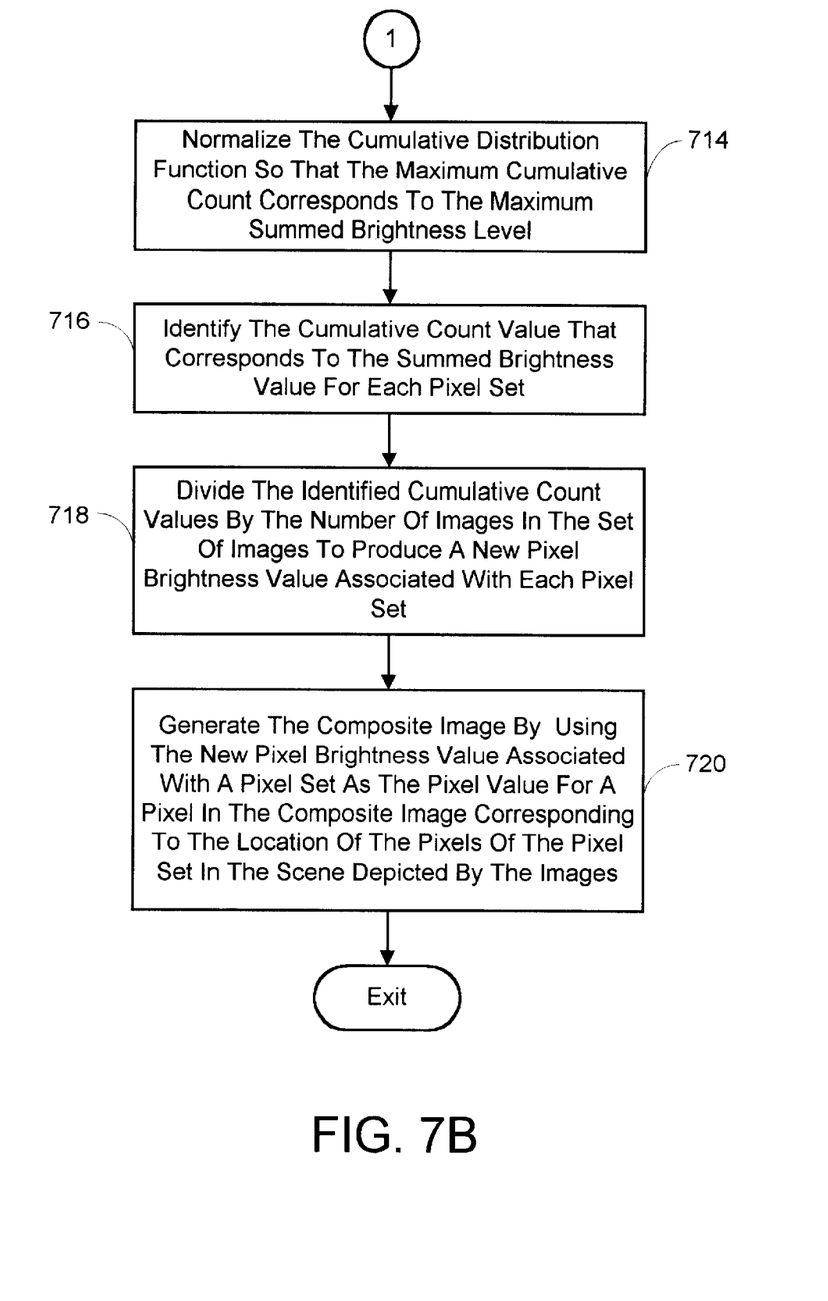

Histogram equalization is a very popular technique in image processing. Essentially, histogram equalization is a process for mapping pixel brightness values of an image to approximate a uniform distribution. In the context of the present invention, the histogram equalization process is preferably performed as follows. Referring to FIGS. 7A and 7B, the first step 700 of the process is to select one of the images of the previously created set of digital images (i.e., the aforementioned bracketed images). One of the pixels of the selected image is then chosen in step 702. The next step 704 in the process is to identify the pixels in the other, non-selected bracketed images that correspond to the chosen pixel of the selected image. As indicated previously, these corresponding pixels are defined as the pixels in the other images that represent the same portion of the depicted scene. The corresponding pixels may simply occupy the same location in each of the images if the images are in registration. However, even if this is not the case, the corresponding pixels can be found using any appropriate conventional method typically used for such a task. The chosen pixel and its corresponding pixels in the non-selected images will be referred to hereinafter as a pixel set.

Once all the pixels in the pixel set associated with the chosen pixel have been identified, their brightness values are summed together to produce a summed brightness value or level (step 706). Steps 702 through 706 are then repeated for each pixel of the selected image, as indicated in step 708. This produces a summed brightness level for each pixel set associated with the bracketed images.

Figure 8A:
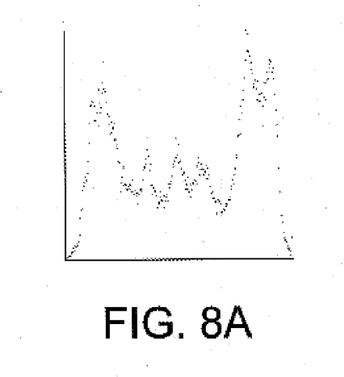
FIG. 8A is a graph plotting the histogram for the summed brightness levels computed for the images of FIGS. 1A through 1C.

The process continues with step 710 which involves taking a count of the number of pixels exhibiting the same brightness level. It is believed that a better result is obtained if the summed brightness values are not averaged down to the original number of levels before histogram equalization. Therefore, the aforementioned brightness levels will correspond to the previously computed summed brightness values associated with the pixel sets. FIG. 8A presents a plot of a histogram for the summed brightness values associated with the images of FIGS. 1A through 1C. The histogram is constructed as follows. For each summed brightness level, the number of pixel sets having that summed brightness level are counted (as indicated above). In this case, each pixel set consists of three corresponding pixels from each of the three images of FIGS. 1A through 1C. In the histogram of FIG. 8A, these counts are plotted on the vertical axis against their associated summed brightness levels on the horizontal axis.

Figure 8B:
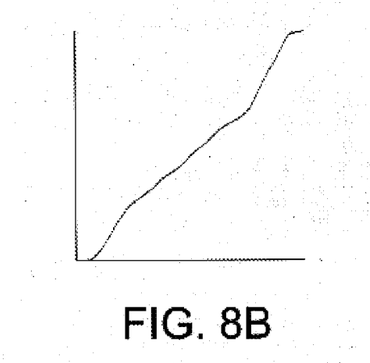
FIG. 8B is a graph of a cumulative distribution function based on the histogram of FIG. 8A.

A cumulative distribution function is next computed using the summed brightness histogram (step 712). Referring to FIG. 8B, this cumulative distribution function can be visualized as follows. For each summed brightness level shown on the horizontal axis, the number of pixel sets at or below that level are plotted on the vertical axis. The cumulative counts are normalized in step 714 to make the maximum count correspond to the maximum summed brightness level. For example, in the case of the three images of FIGS. 1A through 1C, the maximum count could be made equal to the maximum brightness level tripled. The normalized cumulative count value that corresponds to the summed brightness value associated with each pixel set is then identified in step 716. These identified cumulative count values are divided by the number of images in the set of bracketed images to produce a new pixel brightness value associated with each pixel set (step 718). In the example case, the identified cumulative counts would be divided by 3.

The cumulative distribution function is then used to generate the aforementioned composite image. Specifically, as indicated in step 720, the composite image is generated by using the new pixel brightness value associated with a pixel set as the pixel value for a pixel in the composite image corresponding to the location of the pixels of the associated pixel set in the scene depicted by the images.

4.0. Partial Equalization

A potentially advantageous variation on the full histogram equalization process described above is to only partially equalize the image. Partial histogram equalization is beneficial in that it can mitigate the effects of noise, as might be introduced by large areas of a single color in the images. The full histogram equalization techniques tend to stretch such a color to fill the whole gamut, and hence accentuate any noise.

Figure 9A:
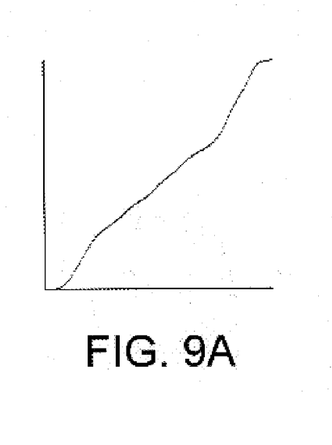
FIG. 9A is a graph of a cumulative distribution function similar to FIG. 8B.
Figure 9B:
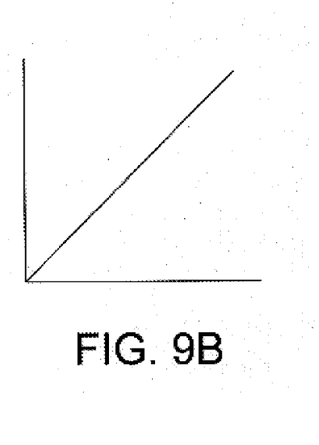
FIG. 9B is a graph of a straight line function.
Figure 9C:
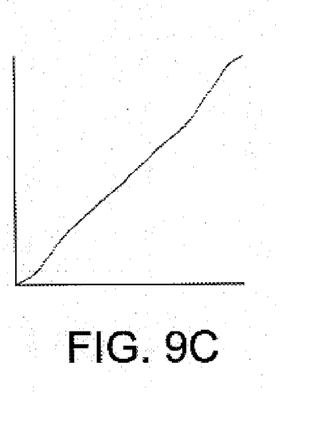
FIG. 9C is a graph of a blended distribution function produced by blending of the cumulative distribution function of FIG. 9A with the straight line function of FIG. 9B.

One way of accomplishing the aforementioned partial equalization is to blend the normalized cumulative distribution function with a straight line function. Referring to FIGS. 9A through 9C, this blending operation is depicted graphically. FIG. 9A presents a graph of a cumulative distribution similar to that of FIG. 8B. A plot of a straight line function is shown in FIG. 9B. This function varies linearly from an origin to an end point at the maximum coordinates, which are the same for both axes. FIG. 9C depicts the result of blending the cumulative distribution with the straight line.

While the foregoing blending operation does mitigate the effects of noise, it may not produce the optimum improvement in exposure and tone in the composite image. This situation can be avoided by weighting the blending operation so that the straight line function contributes less than 100% to the combined function. Thus, the contribution of the straight line function to the combined function could vary anywhere from 0% (i.e., no contribution) to 100% (i.e., equal weighting). The choice of what particular contribution percentage should be used in the blending operation will depend on the images being processed, with the goal being to produce a composite image having the best possible improvement in exposure and tone uniformity in comparison to the bracketed images. For example, a scene depicted in the bracketed images that has large areas of a single color will typically require a greater contribution percentage from the straight line function in order to mitigate the resulting noise and produce the best possible improvement in the composite image. Whereas, images of a scene having fewer large single color areas will not require as much (if any) blending to produce the best possible improvement.

Figure 10A:
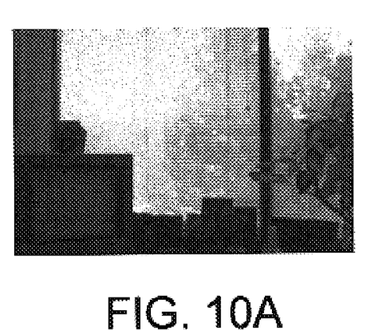
FIG. 10A is a composite image produced from the bracketed images of the office scene of FIGS. 1A through 1C that exhibits a more uniform exposure and tone than any of the bracket images, wherein a full histogram equalization process was employed to generate the composite image.
Figure 10B:
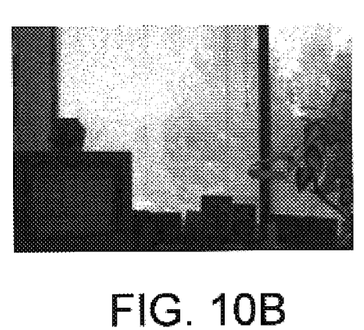
FIG. 10B is a composite image produced from the bracketed images of the office scene of FIGS. 1A through 1C that exhibits a more uniform exposure and tone than any of the bracket images, wherein a partial (i.e., 50%) histogram equalization process was employed to generate the composite image.

In regard to the bracketed images provided in FIGS. 1A through 1C, the results of the foregoing blending operation are shown in FIGS. 10A and 10B. FIG. 10A shows the composite image produced in accordance with the full histogram equalization approach, i.e., without any blending to mitigate noise. FIG. 10B shows the composite image produced using the partial equalization approach and a straight line function contribution percentage of 50%. Notice the improvement in the appearance of the composite image in FIG. 10B.

5.0. Pixel Brightness Values

In the preceding description of the preferred embodiments of the present invention, the pixel brightness values were used as the basis for the processing of the bracketed images. However, there are more than one way to measure pixel brightness. If the images are black and white, then the standard pixel gray levels would preferably be used as the measure of pixel brightness. However, if color images are being processed, pixel brightness is measured differently. In the tested embodiments of the present invention, the red, green, and blue channels were handled as if they represented separate red, green and blue pixels and were all thrown into the same histogram. Thus, a single set of correspondingly located pixels in the images contributed to the histogram counts three times, once for each color channel. This was done based on the assumption that the relationships between the response curves for each channel at different exposures are the same.

An alternate possibility would be to compensate each channel separately. The disadvantage of this approach, however, is that the hue in the image could be changed. Consider for example an image region that has a large variation in the red channel, and a small variation in the blue channel. Per-channel histogram equalization would stretch the blue channel more than the red one, and so the local hue would be changed.

Another possibility would be to base the equalization process on the so-called perceived brightness. In a first version of this option, the standard Y-luminance channel used in video coding is used as the measure of pixel brightness. In another version, the new Y-channel values computed via the equalization process are used as a guide to modify the red, green, and blue channels. Specifically, the amount of compensation applied to the Y-channel associated with a given pixel (i.e., the ratio between the new value and the original value) is used to simultaneously correct the red, green, and blue channels of that pixel.

6.0. Applications

Referring to the suitable computing environment depicted in FIG. 2, the preferred embodiments of the present invention could be implemented as part of a photographic manipulation software program. In addition, present invention could be embodied as special purpose software in newer generation digital cameras which include the capability to employ software programs. To this end, the camera could be configured so as to photograph a scene at different exposures in rapid succession, and to then read out the different pixel values to create the required bracketed images.

What is claimed is:

1. A computer-implemented process for generating a composite image from a set of digital images of a static scene, which exhibits an improved uniformity in both exposure and tone in comparison to the set of images, said process comprising using a computer to perform the following steps:

creating the set of digital images each of which is captured at a different exposure level;

generating the composite image by setting each pixel in the composite image to a pixel brightness level that influences the exposure and tone of the pixel based on the distribution of the pixel brightness levels of the pixels of each image in the set of images, said generating comprising, generating a n-dimensional histogram from the brightness values associated with each pixel of each image in the set of images, wherein n is equal to the number of images in the set of images, fitting a curve to the histogram data, for each data point of the histogram, projecting the histogram data point onto a point of the curve which is nearest to the data point, identifying a new pixel brightness value associated with the point of the curve coinciding with the projected histogram data point, and associating the identified new pixel brightness value with the pixel corresponding to the projected data point, and generating the composite image by using the new pixel brightness value associated with each pixel of one of the images of the set of images as a substitute for an original brightness value of the pixel.

2. The process of claim 1, wherein the generating step comprises the steps of:

computing a summed brightness level for each pixel set in the set of images by adding the brightness level exhibited by each pixel in a pixel set, wherein a pixel set comprises a pixel from each image of the image set which represents the same portion of the scene depicted by the set of images;

generating a cumulative distribution function based on a count of the number of pixel sets having the same summed brightness level;

normalizing the cumulative distribution function so that a maximum cumulative count value thereof corresponds to a maximum possible summed brightness level; and generating the composite image by using the normalized cumulative distribution function to identify a cumulative count value that corresponds to the summed brightness level for each pixel set, dividing the cumulative count value of each pixel set by the number of images in the image set to produce a composite pixel brightness level for that pixel set, and using the composite pixel brightness level associated with each pixel set as the brightness value for a pixel in the composite image corresponding to the location of the pixels of the pixel set in the scene depicted by the set of images.

3. The process of claim 1, wherein the generating step comprises the steps of:

computing a summed brightness level for each pixel set in the set of images by adding the brightness level exhibited by each pixel in a pixel set, wherein a pixel set comprises a pixel from each image of the image set which represents the same portion of the scene depicted by the set of images;

generating a cumulative distribution function based on a count of the number of pixel sets having the same summed brightness level;

normalizing the cumulative distribution function so that a maximum cumulative count value thereof corresponds to a maximum possible summed brightness level;

blending the normalized cumulative distribution function with a straight line function to produce a blended distribution function, said blended distribution function reducing the effects of noise on the distribution function caused by large areas of a single color in the scene depicted in the set of images;

generating the composite image by using the blended distribution function to identify a cumulative count value that corresponds to the summed brightness level for each pixel set, dividing the cumulative count value of each pixel set by the number of images in the image set to produce a composite pixel brightness level for that pixel set, and using the composite pixel brightness level associated with each pixel set as the brightness value for a pixel in the composite image corresponding to the location of the pixels of the pixel set in the scene depicted by the set of images.

4. The process of claim 3, wherein the blending step comprises the step of assigning a weighting factor to the straight line function that determines a degree to which the straight line function contributes to the blended distribution function.

5. The process of claim 4, wherein the weighting factor associated with the straight line function varies in a range which causes the contribution of the straight line function to the blended distribution function to vary anywhere from 0 percent to 100 percent.

6. The process of claim 1, wherein the set of images comprises black and white images and the pixel brightness level comprises a pixel gray level.

7. The process of claim 1, wherein the set of images comprises color images and the red, green and blue pixel channels of each pixel in the composite image are considered as separate pixels, and wherein the pixel brightness level corresponds to the color level of each of the pixels.

8. The process of claim 1, wherein the set of images comprises color images and the pixel brightness level is modeled by the Y-luminance channel, and wherein the red, green and blue pixel levels of each pixel in the composite image are determined in accordance with the Y-luminance channel.

9. A system for generating a composite image that exhibits an improved uniformity in both exposure and tone in comparison to a set of input images each of which exhibits a different exposure level, the system comprising:

a general purpose computing device;

a computer program comprising program modules executable by the computing device, wherein the computing device is directed by the program modules of the computer program to, access said set of digital images;

generate the composite image by setting each pixel in the composite image to a pixel brightness level that influences the exposure and tone of the pixel based on the distribution of the pixel brightness levels of the pixels of each image in the set of images, wherein said generating comprises, generating a n-dimensional histogram from the brightness values associated with each pixel of each image in the set of images, wherein n is equal to the number of images in the set of images, fitting a curve to the histogram data, for each data point of the histogram, projecting the histogram data point onto a point of the curve which is nearest to the data point, identifying a new pixel brightness value associated with the point of the curve coinciding with the projected histogram data point, and associating the identified new pixel brightness value with the pixel corresponding to the projected data point, and generating the composite image by using the new pixel brightness value associated with each pixel of one of the images of the set of images as a substitute for an original brightness value of the pixel.

10. The system of claim 9, wherein the program module for generating the composite image comprises sub-modules for:

(a) selecting one of the images from the set of images;

(b) choosing a previously unselected pixel of the selected image;

(c) identifying a pixel in each of the non-selected images of the image set that corresponds to the chosen pixel of the selected image, wherein a pixel corresponds to the chosen pixel whenever it represents the same portion of the scene depicted by the set of images;

(d) computing a summed brightness level for each pixel set in the set of images by adding the brightness level exhibited by each pixel in a pixel set, wherein a pixel set comprises the chosen pixel from selected image and all of said corresponding pixels in the non-selected images of the image set;

(e) repeating steps (b) through (d) for each pixel of the selected image;

(f) counting the number of pixel sets having the same summed brightness level;

(g) computing a cumulative distribution function based on the count of the number of pixel sets having the same summed brightness level;

(h) normalizing the cumulative distribution function so that a maximum cumulative count value thereof corresponds to a maximum possible summed brightness level;

(i) identify a cumulative count value that corresponds to the summed brightness level for each pixel set;

(j) dividing the cumulative count value of each pixel set by the number of images in the image set to produce a composite pixel brightness level for that pixel set; and (k) generating the composite image by using the composite pixel brightness level associated with each pixel set as the brightness value for a pixel in the composite image corresponding to the location of the pixels of the pixel set in the scene depicted by the set of images.

11. The system of claim 9, wherein the program module for generating the composite image comprises sub-modules for
(a) selecting one of the images from the set of images;
(b) choosing a previously unselected pixel of the selected image;
(c) identifying a pixel in each of the non-selected images of the image set that corresponds to the chosen pixel of the selected image, wherein a pixel corresponds to the chosen pixel whenever it represents the same portion of the scene depicted by the set of images;
(d) computing a summed brightness level for each pixel set in the set of images by adding the brightness level exhibited by each pixel in a pixel set, wherein a pixel set comprises the chosen pixel from selected image and all of said corresponding pixels in the non-selected images of the image set;
(e) repeating steps (b) through (d) for each pixel of the selected image;
(f) counting the number of pixel sets having the same summed brightness level;
(g) computing a cumulative distribution function based on the count of the number of pixel sets having the same summed brightness level;
(h) normalizing the cumulative distribution function so that a maximum cumulative count value thereof corresponds to a maximum possible summed brightness level;
(i) blending the normalized cumulative distribution function with a straight line function to produce a blended distribution function, said blended distribution function reducing the effects of noise on the distribution function caused by large areas of a single color in the scene depicted in the set of images;
(j) identify a cumulative count value that corresponds to the summed brightness level for each pixel set using the blended distribution function;
(k) dividing the identified cumulative count value of each pixel set by the number of images in the image set to produce a composite pixel brightness level for that pixel set; and
(l) generating the composite image by using the composite pixel brightness level associated with each pixel set as the brightness value for a pixel in the composite image corresponding to the location of the pixels of the pixel set in the scene depicted by the set of images.

12. The system of claim 11, wherein the blending sub-module comprises a sub-module for assigning a weighting factor to the straight line function that determines a degree to which the straight line function contributes to the blended distribution function.

13. The system of claim 12, wherein the weighting factor associated with the straight line function varies in a range which causes the contribution of the straight line function to the blended distribution function to vary anywhere from 0 percent to 100 percent depending on the amount of noise reduction required.

14. A computer-readable memory for causing a computing device to generate a composite image that exhibits an improved uniformity in both exposure and tone in comparison to a set of input images each of which exhibits a different exposure level, comprising:
a computer-readable storage medium; and
a computer program comprising program modules stored in the storage medium, wherein the storage medium is so configured by the computer program that it causes the computing device to,
access said set of digital images;
generate the composite image by setting each pixel in the composite image to a pixel brightness level that influences the exposure and tone of the pixel based on the distribution of the pixel brightness levels of the pixels of each image in the set of images, wherein said generating comprises,
generating a n-dimensional histogram from the brightness values associated with each pixel of each image in the set of images, wherein n is equal to the number of images in the set of images,
fitting a curve to the histogram data,
for each data point of the histogram,
projecting the histogram data point onto a point of the curve which is nearest to the data point
identifying a new pixel brightness value associated with the point of the curve coinciding with the projected histogram data point, and
associating the identified new pixel brightness value with the pixel corresponding to the projected data point, and
generating the composite image by using the new pixel brightness value associated with each pixel of one of the Images of the set of images as a substitute for an original brightness value of the pixel.

15. The computer-readable memory of claim 14, wherein the program module for generating the composite image comprises sub-modules for:
(a) selecting one of the images from the set of images;
(b) choosing a previously unselected pixel of the selected image;
(c) identifying a pixel in each of the non-selected images of the image set that corresponds to the chosen pixel of the selected image, wherein a pixel corresponds to the chosen pixel whenever it represents the same portion of the scene depicted by the set of images;
(d) computing a summed brightness level for each pixel set in the set of images by adding the brightness level exhibited by each pixel in a pixel set, wherein a pixel set comprises the chosen pixel from selected image and all of said corresponding pixels in the non-selected images of the image set;
(e) repeating steps (D) through (d) for each pixel of the selected image;
(f) counting the number of pixel sets having the same summed brightness level;
(g) computing a cumulative distribution function based on the count of the number of pixel sets having the same summed brightness level;
(h) normalizing the cumulative distribution function so that a maximum cumulative count value thereof corresponds to a maximum possible summed brightness level;
(i) identify a cumulative count value that corresponds to the summed brightness level for each pixel set;
(j) dividing the cumulative count value of each pixel set by the number of images in the image set to produce a composite pixel brightness level for that pixel set; and
(k) generating the composite image by using the composite pixel brightness level associated with each pixel set as the brightness value for a pixel in the composite image corresponding to the location of the pixels of the pixel set in the scene depicted by the set of images.

16. The computer-readable memory of claim 14, wherein the program module for generating the composite image comprises sub-modules for:

(a) selecting one of the images from the set of images;

(b) choosing a previously unselected pixel of the selected image;

(c) identifying a pixel in each of the non-selected images of the image set that corresponds to the chosen pixel of the selected image, wherein a pixel corresponds to the chosen pixel whenever it represents the same portion of the scene depicted by the set of images;

(d) computing a summed brightness level for each pixel set in the set of images by adding the brightness level exhibited by each pixel in a pixel set, wherein a pixel set comprises the chosen pixel from selected image and all of said corresponding pixels in the non-selected images of the image set;

(e) repeating steps (b) through (d) for each pixel of the selected image;

(f) counting the number of pixel sets having the same summed brightness level;

(g) computing a cumulative distribution function based on the count of the number of pixel sets having the same summed brightness level;

(h) normalizing the cumulative distribution function so that a maximum cumulative count value thereof corresponds to a maximum possible summed brightness level;

(i) blending the normalized cumulative distribution function with a straight line function to produce a blended distribution function, said blended distribution function reducing the effects of noise on the distribution function caused by large areas of a single color in the scene depicted in the set of images;

(j) identify a cumulative count value that corresponds to the summed brightness level for each pixel set using the blended distribution function;

(k) dividing the identified cumulative count value of each pixel set by the number of images in the image set to produce a composite pixel brightness level for that pixel set; and (l) generating the composite image by using the composite pixel brightness level associated with each pixel set as the brightness value for a pixel in the composite image corresponding to the location of the pixels of the pixel set in the scene depicted by the set of images.

17. The computer-readable memory of claim 16, wherein the blending sub-module comprises a sub-module for assigning a weighting factor to the straight line function that determines a degree to which the straight line function contributes to the blended distribution function.

18. The computer-readable memory of claim 17, wherein the weighting factor associated with the straight line function varies in a range which causes the contribution of the straight line function to the blended distribution function to vary anywhere from 0 percent to 100 percent depending on the amount of noise reduction required.

19. A digital camera comprising:

a computing device comprising a component for generating a composite image that exhibits an improved uniformity in both exposure and tone in comparison to a set of images captured by the digital camera;

a computer program comprising program modules executable by the computing device, wherein the computing device is directed by the program modules of the computer program to, cause the digital camera to create the set of digital images each of which is captured at a different exposure level;

generate the composite image by setting each pixel in the composite image to a pixel brightness level that influences the exposure and tone of the pixel based on the distribution of the pixel brightness levels of the pixels of each image in the set of images, wherein said generating comprises, generating a n-dimensional histogram from the brightness values associated with each pixel of each image in the set of images, wherein n is equal to the number of images in the set of images, fitting a curve to the histogram data, for each data point of the histogram, projecting the histogram data point onto a point of the curve which is nearest to the data point, identifying a new pixel brightness value associated with the point of the curve coinciding with the projected histogram data point, and associating the identified new pixel brightness value with the pixel corresponding to the projected data point, and generating the composite image by using the new pixel brightness value associated with each pixel of one of the images of the set of images as a substitute for an original brightness value of the pixel.

20. The digital camera of claim 19, wherein the program module for causing the digital camera to create the set of digital images comprises a sub-module for causing the camera to take the images in rapid succession in response to a command by a user of the camera.

21. A computer-implemented image manipulation process for generating a composite image from a set of digital images of a static scene which were captured at different exposure levels, wherein the composite image exhibits an improved uniformity in both exposure and tone in comparison to the set of images, said process comprising using a computer to perform the following steps:

accessing the set of digital images;

generating the composite image by setting each pixel in the composite image to a pixel brightness level that influences the exposure and tone of the pixel based on the distribution of the pixel brightness levels of the pixels of each image in the set of images, said generating comprising, generating a n-dimensional histogram from the brightness values associated with each pixel of each image in the set of images, wherein n is equal to the number of images in the set of images, fitting a curve to the histogram data, for each data point of the histogram projecting the histogram data point onto a point of the curve which is nearest to the data point, identifying a new pixel brightness value associated with the point of the curve coinciding with the projected histogram data point, and associating the identified new pixel brightness value with the pixel corresponding to the projected data point, and generating the composite image by using the new pixel brightness value associated with each pixel of one of the images of the set of images as a substitute for an original brightness value of the pixel.

22. A computer-implemented process for generating a composite image from a set of digital images of a static scene, which exhibits an improved uniformity in both exposure and tone in comparison to the set of images, said process comprising using a computer to perform the following steps:

inputting the set of digital images each of which is captured at a different exposure level;

computing a summed brightness level for each pixel set in the set of images by adding the brightness level exhibited by each pixel in a pixel set, wherein a pixel set comprises a pixel from each image of the image set which represents the same portion of the scene depicted by the set of images;

dividing the summed brightness level computed for each pixel set by the number of images in the set of images to produce an average brightness level;

generating the composite image by using the average pixel brightness level associated with each pixel set as the brightness value for a pixel in the composite image corresponding to the location of the pixels of the pixel set in the scene depicted by the set of images.

23. A system for generating a composite image that exhibits an improved uniformity in both exposure and tone in comparison to a set of input images each of which exhibits a different exposure level, the system comprising:

a general purpose computing device;

a computer program comprising program modules executable by the computing device, wherein the computing device is directed by the program modules of the computer program to, compute a summed brightness level for each pixel set in the set of images by adding the brightness level exhibited by each pixel in a pixel set, wherein a pixel set comprises a pixel from each image of the image set which represents the same portion of the scene depicted by the set of images, generate a cumulative distribution function based on a count of the number of pixel sets having the same summed brightness level, normalize the cumulative distribution function so that a maximum cumulative count value thereof corresponds to a maximum possible summed brightness level, and generate the composite image by using the normalized cumulative distribution function to identify a cumulative count value that corresponds to the summed brightness level for each pixel set, dividing the cumulative count value of each pixel set by the number of images in the image set to produce a composite pixel brightness level for that pixel set, and using the composite pixel brightness level associated with each pixel set as the brightness value for a pixel in the composite image corresponding to the location of the pixels of the pixel set in the scene depicted by the set of images.

24. A computer-readable medium having computer-executable instructions for causing a computing device to generate a composite image that exhibits an improved uniformity in both exposure and tone in comparison to a set of input images each of which exhibits a different exposure level, said computer-executable instructions comprising:

computing a summed brightness level for each pixel set in the set of images by adding the brightness level exhibited by each pixel in a pixel set, wherein a pixel set comprises a pixel from each image of the image set which represents the same portion of the scene depicted by the set of images;

generating a cumulative distribution function based on a count of the number of pixel sets having the same summed brightness level;

normalizing the cumulative distribution function so that a maximum cumulative count value thereof corresponds to a maximum possible summed brightness level;

blending the normalized cumulative distribution function with a straight line function to produce a blended distribution function, said blended distribution function reducing the effects of noise on the distribution function caused by large areas of a single color in the scene depicted in the set of images; and generating the composite image by using the blended distribution function to identify a cumulative count value that corresponds to the summed brightness level for each pixel set, dividing the cumulative count value of each pixel set by the number of images in the image set to produce a composite pixel brightness level for that pixel set, and using the composite pixel brightness level associated with each pixel set as the brightness value for a pixel in the composite image corresponding to the location of the pixels of the pixel set in the scene depicted by the set of images.

25. The computer-readable medium of claim 24, wherein the blending instruction comprises a sub-instruction for assigning a weighting factor to the straight line function that determines a degree to which the straight line function contributes to the blended distribution function.

26. The computer-readable medium of claim 25, wherein the weighting factor associated with the straight line function varies in a range which causes the contribution of the straight line function to the blended distribution function to vary anywhere from 0 percent to 100 percent depending on the amount of noise reduction required.

27. A digital camera comprising:

a computing device comprising a component for generating a composite image that exhibits an improved uniformity in both exposure and tone in comparison to a set of images captured by the digital camera;

a computer program comprising program modules executable by the computing deice, wherein the computing device is directed by the program modules of the computer program to, cause the digital camera to create the set of digital images each of which is captured at a different exposure level, compute a summed brightness level for each pixel set in the set of images by adding the brightness level exhibited by each pixel in a pixel set, wherein a pixel set comprises a pixel from each image of the image set which represents the same portion of the scene depicted by the set of images, divide the summed brightness level computed for each pixel set by the number of images in the set of images to produce an average brightness level, and generate the composite image by using the average pixel brightness level associated with each pixel set as the brightness value for a pixel in the composite image corresponding to the location of the pixels of the pixel set in the scene depicted by the set of images.

* * * * *

UNITED STATES PATENT AND TRADEMARK OFFICE
CERTIFICATE OF CORRECTION

PATENT NO.   : 6,687,400 B1
DATED        : February 3, 2004
INVENTOR(S)  : Szeliski It is certified that error appears in the above-identified patent and that said Letters Patent is hereby corrected as shown below:

Column 14,
Line 46, "(D)" should be changed to -- (b) --

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,687,400 B1  
APPLICATION NO. : 09/334860  
DATED : February 3, 2004  
INVENTOR(S) : Richard S. Szeliski Page 1 of 1

It is certified that error appears in the above-identified patent and that said Letters Patent is hereby corrected as shown below:

In column 13, line 3, in Claim 11, delete "for" and insert -- for: --, therefor.

In column 14, line 17, in Claim 14, delete "point" and insert -- point, --, therefor.

In column 14, line 26, in Claim 14, delete "Images" and insert -- images --, therefor.

In column 16, line 53, in Claim 21, delete "histogram" and insert -- histogram, --, therefor.

In column 18, line 43, in Claim 27, delete "deice," and insert -- device, --, therefor.

Signed and Sealed this

Nineteenth Day of June, 2012

David J. Kappos  
*Director of the United States Patent and Trademark Office*